July 25, 1950     J. J. GREBE     2,516,381
ENERGY DEVICE
Filed Dec. 28, 1945     2 Sheets-Sheet 1
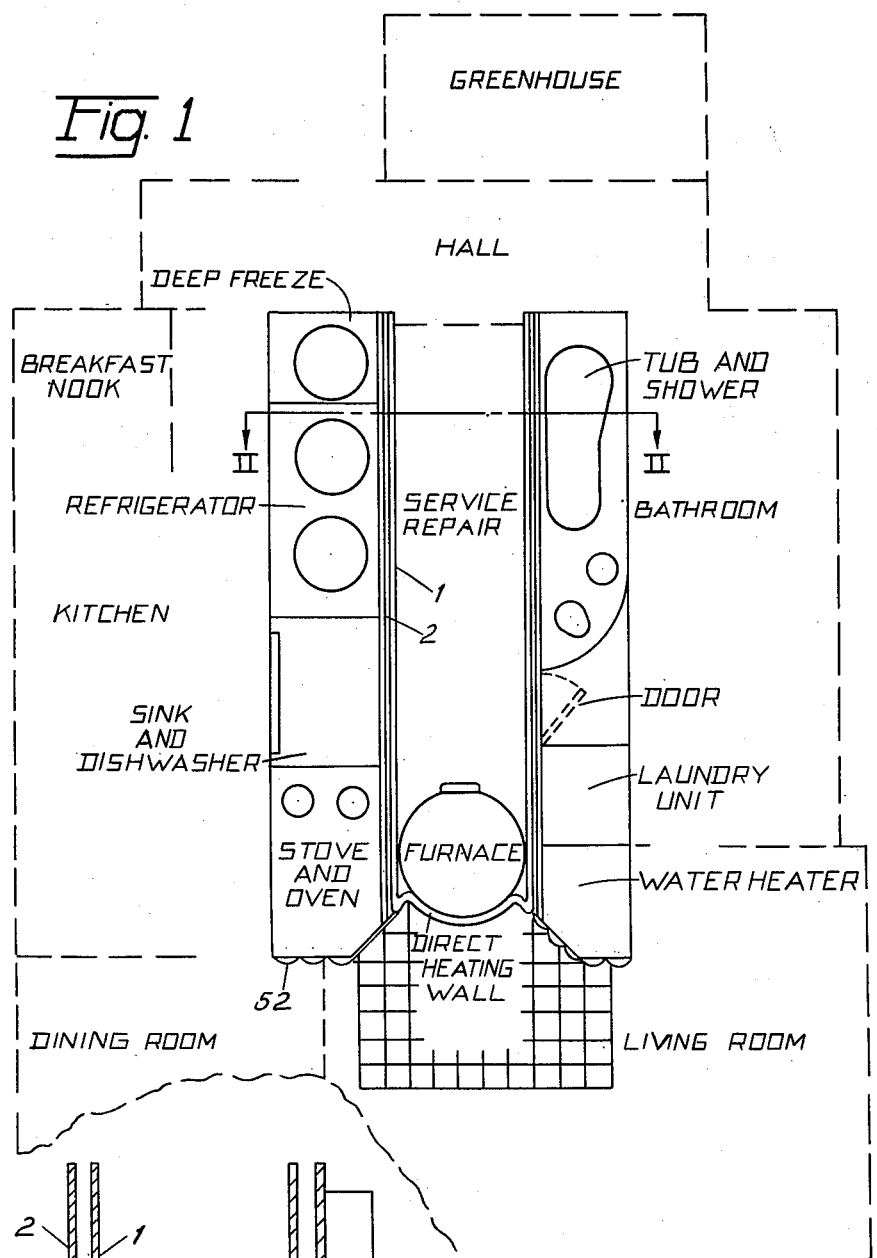
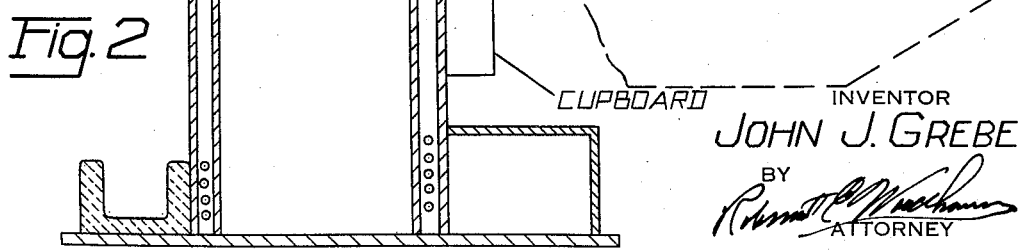
INVENTOR
JOHN J. GREBE
BY
ATTORNEY July 25, 1950   J. J. GREBE   2,516,381
ENERGY DEVICE Filed Dec. 28, 1945   2 Sheets-Sheet 2

INVENTOR
JOHN J. GREBE
BY
ATTORNEY

Patented July 25, 1950

2,516,381

UNITED STATES PATENT OFFICE 2,516,381

ENERGY DEVICE

John J. Grebe, Midland, Mich.

Application December 28, 1945, Serial No. 637,701

7 Claims. (Cl. 237—1)

This invention relates to energy utilization and refers particularly to domestic means for generating and utilizing energy with maximum efficiency.

In the present construction of houses and similar structures it is conventional to provide a number of independent units which both generate and utilize energy and which are placed at selected points around the house according to their particular purposes. By requiring the independent generation of energy for each of these units a great deal of wastage occurs in each heat cycle, both in the original generation of the energy and in the dissipation of unusable heat after the performance of the desired operation. Particular, but not limiting, examples of this latter are the radiation of unwanted heat from a cooking stove into the room and the radiation of unwanted heat from the condenser coils of a refrigerator to the room, and the consequent waste thereof in each case.

It is herein proposed to remedy this situation by providing a single, integrated unit in which heat is generated in whatever quantity is needed and is, from the generating unit, conveyed to whatever units require heat. By placing all of the energy consuming apparatus of the ordinary house together in a single location this energy conveyance can be made easily and efficiently and, further, heat generation and distribution can be readily held under full control.

It will be evident that the various specific plans by which these parts of the integrated whole can be arranged are infinite so that the disclosure hereinafter made of a particular embodiment of my invention is presented solely as an example and should not be in any way taken as limiting the scope of my broad invention.

It will be observed that the energy unit, as herein proposed, is adapted for installation into a building as an article completely finished at the factory, but it will avoid a large part of the charges of rigidity usually made against conventional dwelling prefabrication. Here only the energy generating and utilizing units are prefabricated; the building portions of the house itself are built around this unit and may be constructed in any way the owner desires.

Although there will be some rigidity entailed in the centralizing of the various units involved, the greater part of the house can be built in whatever manner pleases the owner's fancy. Hence, the owner, according to my invention will be able to enjoy the benefit of mass production methods and high energy efficiency for his various household utilities at only a small sacrifice in his otherwise complete freedom to arrange and build his house as he sees fit.

Since my invention may be practiced in a multitude of ways, of which many can be accomplished by the use of presently known apparatus and processes, it is not practical to present detailed directions for a given embodiment. Hence, the accompanying drawing is schematic and the following description is somewhat generalized, although throughout there is given ample information to permit a person normally skilled in the subject matter dealt with herein to practice my invention. Even this generalized illustration of my invention is capable of considerable modification so that it should be considered solely as illustrative and not at all limiting.

In the drawings: Figure 1 shows, in solid lines, a schematic plan representation of one of the many forms which my invention can take.

Figure 2 shows an equally schematic elevation taken on line II—II of Figure 1.

Figure 3:
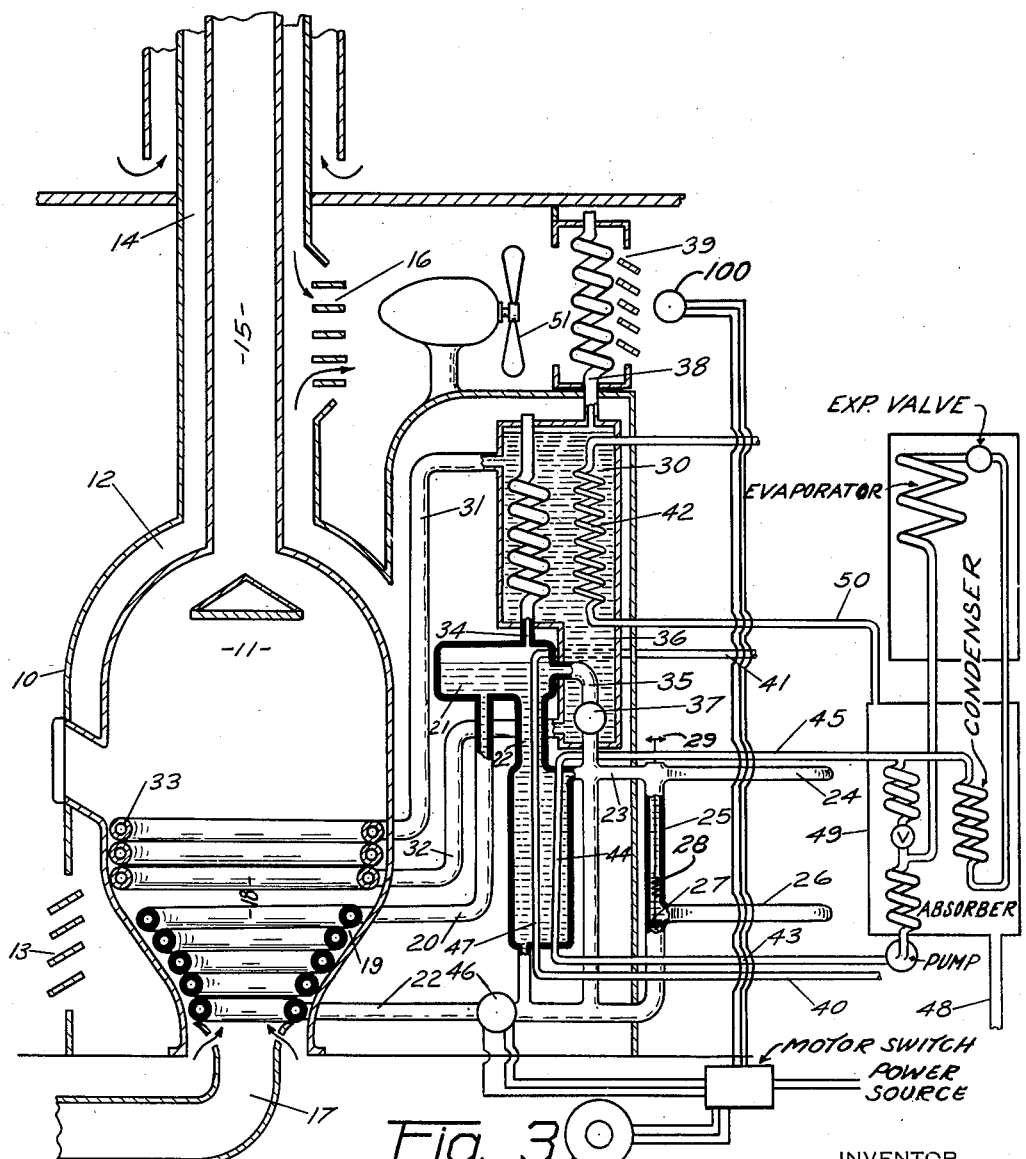
Figure 3 is a diagrammatic sketch showing the construction of heat generating means and illustrating the manner of heat distribution.

As herewith shown and preferred, there is provided a U-shaped wall 1 comprising the central frame of a utility unit for domestic application. This wall may be of any conventional construction and of any suitable material but metallic construction of substantial strength is preferred.

Arranged around the outside of this wall is an enveloping finish wall 2 which may or may not provide structural strength to the whole device but at least serves to cover the pipes, valves and similar apparatus which connect the various units of this device.

Continuing the U-shaped pattern, there is arranged around the finish wall 2 an energy developing unit, as a furnace, and a series of energy consuming units, as a stove, refrigerator, water heater and similar items. The energy developing unit is preferably placed at the bottom of the U for reasons of convenience and efficient organization, but may conceivably be placed elsewhere, if desired for other reasons.

The various utilities which are to be served are arranged on the two sides of the U in whatever pattern is convenient, but in general, they should be arranged from the generating unit in the order of decreasing temperature requirement. Between the arms of the U there is provided access to the backs of the various utility units as well as convenient service space, such as for a workshop.

In providing specific energy developing and distributing means for carrying out the principles above discussed, I have discovered that it may be done by a novel combination of known items of apparatus and that the method above outlined may be thereby readily practiced. In the drawings the apparatus is shown diagrammatically since the individual parts of the apparatus are conventional and the novelty herein resides in their particular arrangement.

Referring now to Figure 3 there is shown a furnace 10 having a conventional combustion chamber 11, a conventional heating jacket schematically indicated at 12 with a cold air entrance 13 thereinto. The warm air flowing upward moves through a conduit 14 surrounding the chimney tube 15 to an outlet 16 in the manner described in my copending application entitled "Heating and Ventilating Method and Means" Serial Number 637,702 filed December 28, 1945. Fuel, such as coal, and necessary air are by any conventional means, such as an underfeed stoker mechanism, provided through a fuel feeding tube 17, or other convenient means, through the bottom of the furnace where it burns in a fuel chamber 18. Other fuels and fuel and air feeding mechanisms may, of course, be alternatively and supplementarily used as desired.

Surrounding the fuel entrance port and substantially defining a fire pot is a lower coil 19 containing a heat exchange fluid, such as, diphenol and diphenol ether. Fluid compounds of this type such as "Dowtherm" manufactured by the Dow Chemical Company of Midland, Michigan are currently available on the market. An offtake pipe 20 conducts the heat exchange fluid to a high-temperature liquid reservoir 21 from which there lead three conduits. The return flow conduit 22 leads out from the said reservoir 21 and returns to the coil 19 as a return passageway. From the conduit 22 there is an offtake 23 supplying any form of heated element, such as an upper hot plate coil 24, which has a hollow interior for the reception of the heated liquid. This may be used for food preparing purposes. A connecting conduit 25 leads the heated liquid to a lower hot plate coil 26 which may be separately used if desired or, preferably, in cooperation with the upper hot plate coil 24 to heat suitable oven space between the said two plates. From the lower end of the connecting conduit 25 there is a passageway into the return conduit 22. This passageway is selectively closed by a valve 27 controlled by a thermostat 28 which may be suitably adjusted by an indicating dial 29.

Adjacent to the high-temperature-liquid reservoir 21 there is an intermediate-temperature-liquid reservoir 30 connected by a supply conduit 31 and a return conduit 32 to an upper coil 33 arranged above the lower coil 19 in a manner to define a continuation of a fire pot. This system will normally contain water and, like the heat exchange fluid containing parts, will comprise a return-flow system.

A coil 34 extends upwardly from the high-temperature-liquid reservoir 21 through the intermediate-temperature-liquid reservoir 30 to the atmosphere and provides a reflux for the heat exchange fluid. A conduit 35 extends from the high-temperature-liquid reservoir 21 through a depending portion 36 of the intermediate-temperature-liquid reservoir 30 and returns to the conduit 22 of the high temperature, or heat exchange fluid, system. The thermostat 37 is associated with a suitable valve and controls the passage of the high temperature liquid through the conduit 35. A suitable conduit 40 may extend from any convenient source of water exteriorly of the furnace through a steam generator 41 located in a portion of the return heat exchange fluid conduit 22 and may discharge superheated, or other, steam through a steam supply conduit 41 as desired for such cooking or other use may be useful.

A short passageway 38 extends upwardly from the top of the intermediate-temperature-liquid reservoir 30 to a radiator 39 which opens to the atmosphere and acts as a reflux for the water. This radiator is surrounded by a third, or low-temperature-fluid, here the atmospheric air. A suitable coil 42 is located in the water tank 30 and fitted with suitable external connections for the provision of hot water for miscellaneous uses within the establishment as needed.

Other liquid may be heated in similar manner. For example, an ammonia and water carrying conduit 43 may extend from the absorption and pump stage of an absorption type refrigerator and pass through a portion of the return high temperature conduit 22 to provide the generator element 44 of said refrigerator. The conduit 45 then provides passageway from said generator to the condensing element of said refrigerator. Said generator element may, of course, be used with any other type of heat operated refrigerator, wherein a continuous supply of heat may be utilized either continuously or intermittently. The water introduced into the heating coil 42 may be conveniently preheated by being used to cool the refrigerator condenser, water and absorber coils. Thus water may be introduced through the inlet pipe 48 into a housing 49 surrounding said members to be cooled and then led out through the conduit 50 to said heating coil 42.

The fire will be hottest in the region of the lower heat exchange fluid coil 19 and even when the fire is very low this coil will be heated. Thus, an adequate supply of heated fluid will pass through this system even when the fire is at a minimum. Heated liquid will flow by thermo-convection out and upward through the outlet conduit 20 to the reservoir 21. From here its first tendency is to return through the return conduit 22 to the lower part of the coil 19 for further heating. Although the greater part of the liquid will follow the return conduit 22, as the stove or oven thermostat 28 acts to open the valve 27 a portion will be diverted to pass through the conduits 23 and 25, and thereby provide entry into and circulation through the respective upper and lower plate coils 24 and 26. As progressively more heat is required to maintain the temperature determined by the control 29 and controlled by the thermostat 28, the valve 27 will be opened to a progressively greater degree by which more and more high temperature liquid is passed through the stove and oven.

Similar thermostatic and valve systems placed in suitable portions of appropriately modified conduits connecting the said discharge conduit 22 may control the stove and oven temperatures individually if desired. Other stove and oven, or other heating elements may be used and similarly controlled.

As the heat exchange fluid increases in temperature to its boiling point it will ascend through the coil 34 for refluxing and thereby convey its excess heat into the water within the intermediate-temperature-liquid reservoir 30. Thus, in addition to the heating of the water within the said reservoir 30 by the coil 33, the said water will be further heated by the refluxing heat exchange fluid within the coil 34.

Further, there is provided the supplementary heating conduit 35 for the intermediate-temperature-liquid. When the water within the reservoir 30 falls below a predetermined temperature, such as 200° F., the thermostat 37 will open its associated valve and permit a flow of heat exchange fluid directly through the body of said water. This, being at a low point in said tank, will quickly cause a local circulation therein and a rapid warming of all of the water within said tank. Thus, the service water for the building passing through the coil 42 will be heated and will always remain at least at the predetermined temperature, such as 200°.

Normally, however, it will be necessary to provide other and direct heating of the intermediate-temperature-liquid, a water, within the intermediate-temperature-liquid reservoir 30 so that there is provided the above-mentioned upper heating coil 33 and the appropriate connecting conduits. Thus the fire within said furnace will heat the water to a point at or near its boiling point and will ordinarily do so without difficulty even though the fire in the fire pot is small. If and when the water within the said reservoir 30 boils, it will reflux in the radiator 39 and be thus cooled and returned to said tank. Room heating air or other air desired to be heated may be passed through said radiator for the utilization of the heat thus liberated at that point. A fan 51 may be provided to assure a constant flow of air through said radiator.

It will thus be observed that this equipment will automatically adjust the fluids involved to the various desired operating temperatures. The high-temperature-liquid being adjacent the hottest portion of the fire will be easily kept at a high temperature, normally approximately 500° F., and will be utilized for stove and oven purposes, for operating a refrigerator and for producing superheated, or other, steam through the steam generator 47 if desired. As demands for heat are being made by any of the services supplied through this system the effect will be a cooling of the high temperature liquid. This will be interpreted by a thermosensitive element 46 and proper adjustment thereby automatically made of the fuel feeding means. Thus, any deficiency of heat in the high temperature liquid is quickly corrected by an increase in the fuel supply.

Any excess of heat in the high temperature system is transferred into the water within the reservoir 30 by its refluxing within the coil 34. Thus, the high temperature liquid always remains at a proper operating temperature and any excess is absorbed into the intermediate-temperature-liquid system, here, the water system. This system likewise remains within the predetermined temperature range. When it gets below the predetermined temperature, as 200° F., additional heat is secured from the by-pass 35. Any excess temperature will cause it to reflux in the radiator 39 by which said excess heat is absorbed by air used for heating the building. Thus, the temperatures of these two liquid systems will be held within close operating limits and the services supplied by them at their respective, predetermined temperatures will receive constant supplies of heat as needed to maintain said temperature.

Any deficiency of heat in the room will, by usual means, be immediately reflected in the call to the furnace for more heat and consequent increase in the fuel supply. A deficiency of heat in any of the services supplied by the furnace will through the thermo-sensitive element 46 effect a similar adjustment. Any excessive furnishing of heat by the furnace will be quickly manifested in excessive heating of the air passing through the radiator 39. The thermo-sensitive element 100 positioned proximate to the radiator 39 will respond to such excessive heating and promptly act through any conventional means such as an automatically responsive motor switch controlling the speed of operation of a stoker motor to reduce the fuel supply to the furnace. It will be understood that the thermo-sensitive element 100 could be positioned anywhere in the room and perform the same function satisfactorily. Other thermo-sensitive elements may be added in other positions in conventional ways and according to conventional practice to secure greater sensitivity of control but they would merely be an elaboration upon the controls already shown and are, therefore, not illustrated or described. This, of course, does not preclude the use of the conventional upper limit, or dome, thermostat and associated controls to prevent undue heating or overrunning of the furnace.

In this way there are provided two fluid systems each held at substantially constant but different temperatures from which service fluids, or other operating means are given heat as appropriate. Further, the fluids are so related that an excess of heat in one is absorbed by the next and an excess of heat in said next is absorbed by a third operating fluid, here the surrounding air, and excessive heat acts to reduce the fuel supply to the heat generator. Thus, the system is closely integrated and operates with a maximum of efficiency. It will be evident that these heat sources may be utilized in many ways other than the exact ways shown in the drawings. Uses other than those expressly specified may be introduced and some of those specified may be eliminated without changing my invention. Although the building is indicated as heated by warm air flowing from around the chimney and furnace through the radiator 39, additional heating may be provided by either steam or hot water wherever desirable. It will be particularly desirable and efficient to provide a plurality of vertically aligned conduits 52 (Fig. 1) along the wall for a short distance on each side of the furnace to provide radiant heat into the living room by warm water flowing therethrough. It will also be easy to provide conduits under a floor, or at least under the fireplace apron, likewise receiving and conducting a flow of warm water. Such conduits for heating fluid may also be used for cooling by passing a cold liquid, as water, therethrough.

While not essential to the main purposes of my invention, it will also be possible and often desirable to provide the outward side of the heat generating unit with a transparent wall to give to the room which it faces, the living room as indicated in the drawing, the effect of a fireplace and also to provide radiant heat to the occupants of the room. A heat resistant curtain will need to be provided to cover this wall during warm weather to prevent the escape of heat into the room when it is not wanted but when a minimum fire is nevertheless being maintained for operating the utilities.

Innumerable variations and modifications will be apparent to persons acquainted with equipment of this general type and the design thereof. Particularly, it should be mentioned that although air is here shown as the third and last fluid in the system, the principle herein disclosed is not so limited but may be applied through a substantial plurality of associated fluids of which atmospheric air may or may not be the last one. Although the embodiment herein used for illustrative purposes is a household unit, it is evident that the principles here disclosed are, at least in part, applicable to other types of buildings, such as restaurants and hotels. These variations are all embraced with the general scope of my invention and will accordingly be included within the purview of the hereinafter appended claims excepting as said claims expressly provide otherwise.

I claim:

1. In providing energy for utilization by a plurality of energy utilizing utilities, the process; generating heat; heating a first fluid to a relatively high temperature; heating a second fluid to a relatively high but lesser temperature; permitting said first fluid to discharge excess heat into said second fluid by refluxing using said second fluid as the cooling medium for said refluxing operation; utilizing said fluids as sources of energy at different temperature levels.

2. In providing energy for utilization by a plurality of energy utilizing utilities, the process; generating heat; heating a first fluid to a relatively high temperature; heating a second fluid to a relatively high but lesser temperature; permitting said first fluid to discharge heat into said second fluid by refluxing using said second fluid as the cooling medium for said refluxing operation; permitting said second fluid to discharge heat to a third fluid by refluxing using said third fluid as the cooling medium for said refluxing operation; controlling the minimum fuel supply to the heat generator by the temperature of the said first fluid and controlling the maximum fuel supply to said heat generator by the temperature of the said third fluid; utilizing said three fluids as sources of heat at different temperature levels.

3. In providing energy for utilization by a plurality of energy utilizing utilities, the process; generating heat; heating a first fluid to a relatively high temperature; heating a second fluid to a relatively high but lesser temperature; permitting said first fluid to discharge heat into said second fluid by refluxing using said second fluid as the cooling medium for said refluxing operation; permitting said second fluid to discharge heat to a third fluid by refluxing using said third fluid as the cooling medium for said refluxing operation; conducting a portion of said first fluid to a cooking unit and utilizing the heat thereof for cooking purposes; utilizing each of said fluids as sources at respectively different temperature levels for indirect heating of other means.

4. An energy developing and distributing unit comprising the combination: means developing heat energy in a confined space; means heating a first fluid from said space to a relatively high temperature; means heating a second fluid from said space to a relatively high but lesser temperature; means permitting said second fluid to discharge heat to a third fluid by refluxing within means contacted by said third fluid; means utilizing said fluids as sources of energy at different temperature levels for purposes appropriate to said temperature levels; means utilizing said first named fluid for the indirect heating of a service fluid to a relatively high temperature; means utilizing said second fluid for the indirect heating of another service fluid to a relatively lesser temperature; means utilizing said third fluid for heating other means.

5. An energy developing and distributing unit comprising the combination: a heat generating element; a plurality of independently confined fluids heated to different temperature levels by said heat generating element; a plurality of refluxing elements adapted for transferring heat in excess of a predetermined temperature from one of said fluids to another of said fluids; a further fluid heated by one of said plurality of fluids; a plurality of heat consuming elements operatively associated with and withdrawing heat from said fluids.

6. In a domestic dwelling, an operatively associated heat generating element and a plurality of heat utilizing elements integrated by a heat conservation unit, said heat conservation unit comprising: at least two independently confined heat transfer fluids heated to different temperatures by said heat generating element; means for transferring heat above a predetermined temperature from the one of higher temperature of said first two named fluids to the one of lower temperature thereof; at least one additional independently confined heat transfer fluid heated by one of said fluids which are heated by said heat generating element; at least one service fluid heated by one of said heat transfer fluids.

7. In a domestic dwelling, an integrated thermal-energy unit comprising: a plurality of thermal-energy consuming elements including service fluids; a thermal-energy generating element operatively associated with said thermal energy consuming elements as hereinafter provided and adapted for generating all the thermal-energy required in such domestic dwelling; a plurality of independently confined thermal-energy conducting fluids heated by said generating element to different temperature levels and each connected to at least one of said heat-energy consuming elements in accordance with the temperature level requirement of said element; thermal-energy conservation means interposed between said thermal-energy generating element and said thermal-energy consuming elements including a plurality of thermal exchangers adapted for passing thermal-energy from each of those conducting fluids having a relatively higher temperature to those of said fluids having a lower temperature level and one of said fluids passing thermal energy into the air in said dwelling; means responsive to the temperature of said heat energy conducting fluids controlling the fuel supply to the heat energy generating element, whereby each service fluid is supplied with heat energy at a predetermined temperature level but the total thermal-energy supplied at any given time is only equal to the thermal-energy demand irrespective of the particular thermal demand upon each fluid.

JOHN J. GREBE.

REFERENCES CITED

The following references are of record in the file of this patent:

UNITED STATES PATENTS

| Number | Name | Date |
|---|---|---|
| 195,419 | Tillack | Sept. 18, 1877 |
| 1,440,926 | Macdonald | Jan. 2, 1923 |
| 2,089,176 | Barron | Aug. 10, 1937 |
| 2,320,532 | Munters | June 1, 1943 |